United States Patent [19]

Schroeder

[11] 4,251,182
[45] Feb. 17, 1981

[54] PIVOT PIN ASSEMBLY

[75] Inventor: William L. Schroeder, Buffalo Grove, Ill.

[73] Assignee: International Harvester Company, Chicago, Ill.

[21] Appl. No.: 64,309

[22] Filed: Aug. 6, 1979

[51] Int. Cl.³ ............................................ F16C 11/02
[52] U.S. Cl. ............................... 414/723; 308/237 R; 403/158
[58] Field of Search ................... 414/723, 722; 403/10, 403/158, 154, 157, 16; 308/237 R, 237 A; 37/118 R, 117.5, 103

[56] References Cited

U.S. PATENT DOCUMENTS

| | | | |
|---|---|---|---|
| 3,152,846 | 10/1964 | Dumpis | 403/158 X |
| 3,198,563 | 8/1965 | Steidl | 403/154 |
| 3,211,501 | 10/1965 | Clark et al. | 308/237 R X |
| 3,543,863 | 12/1970 | Ball et al. | 414/723 X |
| 4,096,957 | 6/1978 | Iverson et al. | 414/723 X |
| 4,101,180 | 7/1978 | Anderson et al. | 308/237 R X |
| 4,133,121 | 1/1979 | Hemphill | 414/723 X |
| 4,203,684 | 5/1980 | Stecklein | 414/723 X |

Primary Examiner—Stephen G. Kunin
Assistant Examiner—Terrance L. Siemens
Attorney, Agent, or Firm—Ronald C. Kamp; F. David AuBuchon

[57] ABSTRACT

A serviceable pivot pin assembly having a pin with a lubricant reservoir rotatably mounted on bearings and releasably secured to both a thrust ring and to bucket brackets through an end plate.

6 Claims, 2 Drawing Figures

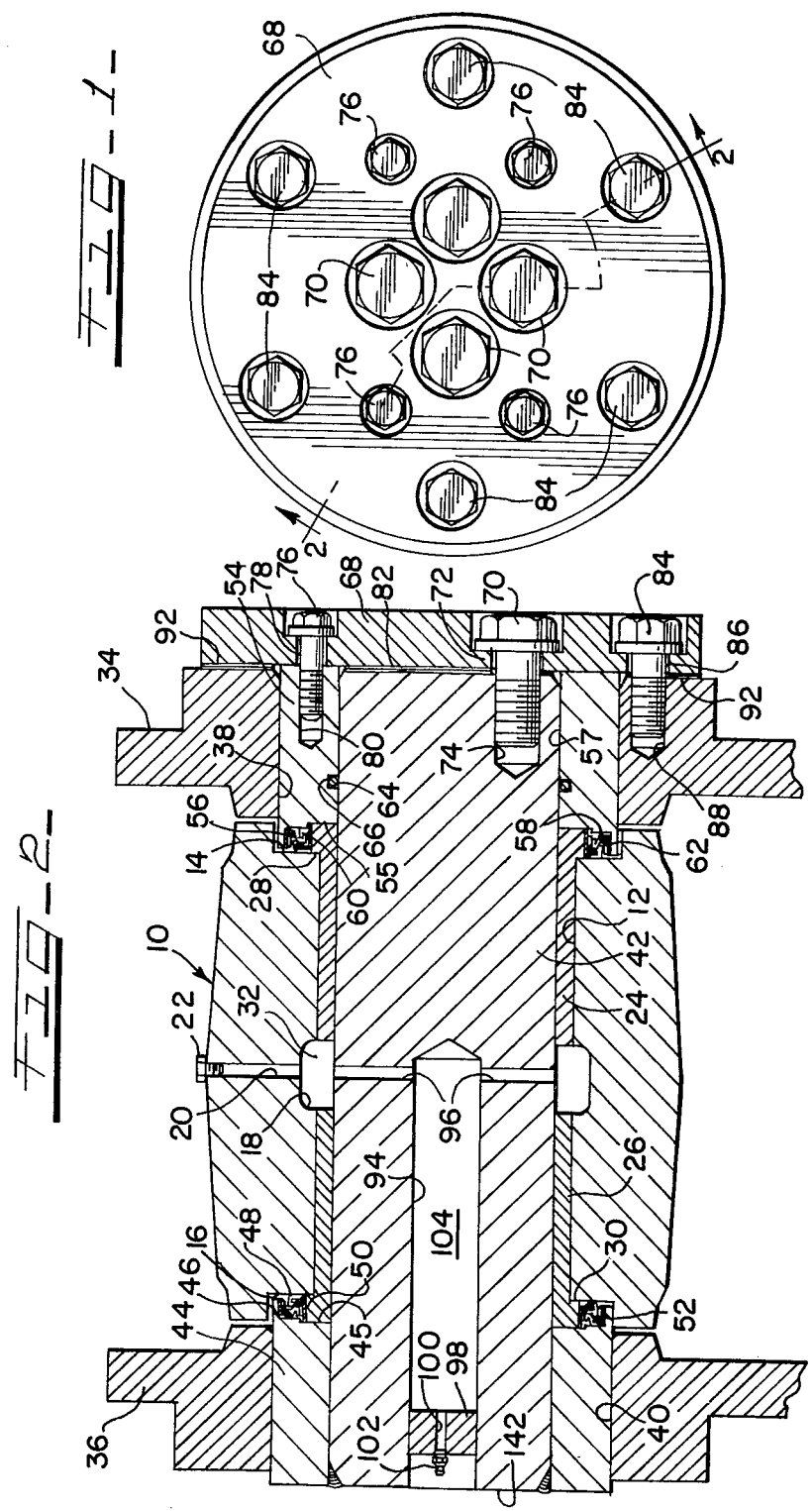

PIVOT PIN ASSEMBLY

BACKGROUND AND SUMMARY OF THE INVENTION

Pivot pin assemblies which are utilized for pivotal attachment of a bucket to the boom arms of a loader are exposed to a very hostile environment due to the abrasive nature of materials being handled by the bucket and the close proximity of such assemblies to those materials. In addition, such pivot pin assemblies are subjected to severe loading as a result of manipulation of the bucket and the loader vehicle in order to fill the bucket with the material being handled and to then extricate the material from the bucket, often requiring the intentional imposition of shock loading in order to vibrate the bucket and thereby dislodge any material adhering to it. The seals and bearings or bushing utilized in such pivot pin assemblies will have a life expectancy which is less than the loader vehicle itself. It is therefore desirable to provide a pivot pin assembly in which the seals and/or bearings can be readily replaced.

The pivot pin assemblies of the prior art, as exemplified by U.S. Pat. Nos. 3,997,274 and 4,096,957, have incorporated collets, which are expensive to manufacture because of their shape and the relatively close tolerances required, or have been welded at both ends making repair thereof extremely difficult or impractical.

It is, therefore, an object of this invention to provide a pivot pin assembly which has a self-contained lubricant reservoir, which may be disassembled and reassembled with relative ease, and in which the seals and bearings are serviceable.

It is also an object of this invention to provide such a pivot pin assembly which is capable of tolerating side thrust loads and which provides lubricant to the bearing area for taking the side loads in its entirety.

It is another object of this invention to provide a pivot pin assembly with a self-contained lubricant capability which has a double reservoir and which may be filled with ease.

These and other objects of the present invention, and many of the attendant advantages thereof, will become more readily apparent upon a perusal of the following description of a preferred embodiment when considered in connection with the accompany drawing, wherein;

FIG. 1 is an end view, in elevation, of a pivot pin assembly according to the present invention, and;

FIG. 2 is a cross section view taken on line 2—2 of FIG. 1.

DESCRIPTION OF A PREFERRED EMBODIMENT

Referring now to the drawing, the free end of a loader boom arm, shown in cross-section at 10, is provided with a transverse bore 12, which is counterbored at each end to form annular recesses 14 and 16. The transverse bore 12 intersects an interior groove 18, as does a cross-bore 20. A tapped portion at the outer end of cross-bore 20 permits the insertion of a threaded plug 22 to seal the cross-bore. A pair of sleeve bearings 24 and 26 having an integrally formed, outward-projecting, thrust flange 28 and 30 respectively are pressed into the transverse bore 12, so that each bearing is non-rotatably retained relative to the boom arm 10, with the flanges 28 and 30 seated against the bottom of the recesses 14 and 16 respectively. So positioned, the inner ends of the bushings form with the groove 18 a reservoir chamber 32.

The bucket has a pair of brackets 34 and 36 affixed to and positioned on the bucket to span the loader boom arm. The brackets 34 and 36 are provided with aligned bores 38 and 40 respectively. A pivot pin 42 having an enlarged head 44, which functions as a seal retainer and axial thrust ring, is inserted through the bore 40 in the bracket 36, through the bearings 26 and 24 in the boom arm 10 and into the bore 38 in the bracket 34. The enlarged head 44, which may be formed integral with the pin 12 as by forging, for example, or as a separate member and secured by welding as shown in FIG. 2, is counterbored or machined to provide an annular recess 45 defining an axially extending flange 46. The bottom of the machined recess abuts the thrust flange 30 of the bearing 26. A lip seal 48, which may be either of the single or double face type, has one of its portions 50 pressed over the outer cylindrical edge of the flange 30 and the other complementary portion 52 pressed into inner cylindrical surface of the axial flange 46 before the pin 42 is inserted as previously described. With the pin 42 so inserted and with the head 44 abutting the thrust flange 30, the portions 50 and 52 of the seal 48 will be properly engaged.

A seal retainer and thrust ring 54 having a bore 57 capable of slidably receiving the pin 42 is counterbored or machined to provide an annular recess 55 defining an axially extending flange 56, similar to that provided on the enlarged head 44. The bottom of the machined recess abuts the thrust flange 28 of the bearing 24. A lip seal 58, which may be the same type as seal 48, has one of its portions 60 pressed over the outer cylindrical edge of the flange 28 and the other complementary portion 62 pressed into the inner cylindrical surface of the axial flange 56. When the thrust ring 54 is pushed over the end of the pin 42 the seal portions 60 and 62 will engage to provide a proper seal. An O-ring seal 64 is provided in a groove 66 in the thrust ring 54 to prevent leakage of lubricant between the ring 54 and the pin 42.

An end plate 68 is secured to the pin 42 by cap screws or bolts 70 which pass through bores 72 in the plate 68 to engage threaded blind bores 74 in the pin 42. The plate 68 is also secured to the thrust ring 54 by bolts 76 which pass through bores 78 in the plate 68 to engage threaded blind bores 80 in the ring 54. An inner shim pack 82 may be provided between the pin 42 and the plate 68. The shim pack 82 is selected, when needed, to have a thickness which would prevent the thrust flanges 28 and 30 from being preloaded in compression as a result of tightening the bolts 70 and 76.

Bolts 84 extend through bores 86 in the plate 68 to engage threaded blind bores 88 in the bracket 34. These bolts 84 insure that the plate 68 does not rotate relative to the bracket 34 and, in cooperation with the bolts 70 and 76, insure that the pin 42 and the thrust ring 54 do not rotate relative to the bracket 34. Since the head 44 is secured to or a part of the pin 42, the entire assembly, i.e. brackets 34 and 36, pin 42, head 44, thrust ring 54 and plate 68 will rotate as a unit relative to and on the bearings 24 and 26. An outer shim pack 92 may be provided and is selected, when needed, to have a thickness which may be different from that of shim pack 82, but which permits the bolts 84 to be tightened without loading the thrust flanges 28 and 30. The pin 42 is provided with an axial bore 94 which communicates with a cross-bore 96. The cross-bore 96 being located to communicate with the reservoir chamber 32. A plug 98 is pressed into the bore 96 and serves to seal the open end thereof. A central opening 100 is then provided in the plug 98 and a lubricant fitting 102 is sealingly secured in the opening 100. The fitting 102 preferably is of the type which permits liquids to be forced into the the bore 96, but prohibit reverse flow. In order to protect the fitting 102 from damage, it is preferred that the plug 98 be forced into the bore 98 a distance sufficient to recess the fitting 102 below the end surface 142 of the pin 42.

It is apparent from the foregoing that the bore 98 inside of the plug 98 functions as a reservoir 104 for the lubricant and that the cross-drill 96 permits ready communication and transmittal of the lubricant into the reservoir chamber 32. Initial filling and refilling of the reservoir 104 and the chamber 32 can be easily achieved by removal of the plug 22. Lubricant inserted through fitting 102 will permit air inside the reservoir and chamber to be expelled from cross-bore 20 and the appearance of lubricant there will provide assurance that the reservoir and chamber are filled with lubricant.

It will be appreciated that removal of the bolts 70, 76 and 84 will permit removal of the thrust ring 54 and the pin 42. The seals 48 and 58 can therefore be readily replaced as can the bearings 24 and 26. The thrust flanges 28 and 30, which function as thrust bearings, being integral with the bearing 24 and 26 are restrained from rotation inherently with the restraint of the bearings 24 and 26, obviating any need for a separate retainer.

It will be appreciated that the present invention also simplifies initial manufacture and assembly. The machining of the boom arm; viz. the boring of transverse bore 12 and the counter bores to form annular recesses 14 and 16, and the drilling and tapping of the cross-bore 20; and the insertion of the thrust flanged, sleeve bearings may be performed separately to produce a sub-assembly. Similarly, the machining of the bucket brackets 34 and 36, and a comparable pair, and their attachment to the bucket will produce a second sub-assembly. The remaining elements of the pivot pin assembly can be produced separately to provide a third sub-assembly. Each sub-assembly can then be produced in the most expeditious manner and then joined together upon final assembly.

While one embodiment of the present invention has been illustrated and described herein, it is understood that various changes and modifications may be made therein without departing from the spirit of the invention as defined by the scope of the appended claims.

What is claimed is:

1. A serviceable pivot pin assembly for pivotal mounting of a bucket on a boom arm, said bucket have a pair of brackets secured thereto and said boom arm having a transverse bore, said assembly comprising:
   bearings retained in said transverse bore;
   a pin having an enlarged head extending through said brackets and rotatably in said bearings;
   a thrust ring on the end of said pin and an end plate;
   releasable securing means connecting said pin, said thrust ring, said brackets and said end plate as a unit to rotate on said bearings.

2. A serviceable pivot pin assembly according to claim 1, wherein said bearings comprise a pair of sleeve bushings, each having an axially extending thrust flange non-rotatably retained in said transverse bore with said flange on opposite sides thereof.

3. A serviceable pivot pin assembly according to claim 2, and further comprising a pair of lip seals, one positioned between said head and one of the adjacent flange and the other positioned between the thrust ring and the other of said flanges.

4. A serviceable pivot pin assembly according to claim 1 or 3 and further comprising:
   a reservoir formed in said pin;
   a lubricant fitting communicating with said reservoir; and
   means for communicating lubricant from said reservoir to said bearings.

5. A serviceable pivot pin assembly according to claim 4, wherein the adjacent ends of said bearings are axial spaced and said longitudinal bore is provided with an internal groove within said axial space defining with said ends a reservoir chamber; and said lubricant communicating means is a cross-drill in said pin intersecting said reservoir and said reservoir chamber.

6. A serviceable pivot pin assembly according to claim 5 and further comprising a cross-bore in said boom arm between the exterior thereof and the reservoir chamber and a plug removeably retained in said cross-bore.

* * * * *